United States Patent [19]
Woster et al.

[11] Patent Number: 5,892,946
[45] Date of Patent: *Apr. 6, 1999

[54] SYSTEM AND METHOD FOR MULTI-SITE DISTRIBUTED OBJECT MANAGEMENT ENVIRONMENT

[75] Inventors: George W. Woster, Dallas; Melissa A. Linares; Mahesh V. Shah, both of Plano, all of Tex.

[73] Assignee: Alcatel USA, Inc., Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 526,953

[22] Filed: Sep. 12, 1995

[51] Int. Cl.⁶ ...................................................... G06F 9/40
[52] U.S. Cl. ................................................................ 395/680
[58] Field of Search .................................... 395/683, 614, 395/680, 200.47, 200.48, 200.49

[56] References Cited

U.S. PATENT DOCUMENTS

| | | | |
|---|---|---|---|
| 5,287,507 | 2/1994 | Hamilton et al. | 395/683 |
| 5,301,319 | 4/1994 | Thurman et al. | 395/614 |
| 5,303,375 | 4/1994 | Collins et al. | 395/670 |
| 5,307,490 | 4/1994 | Davidson et al. | 395/684 |
| 5,377,350 | 12/1994 | Skinner | 395/683 |
| 5,396,630 | 3/1995 | Banda et al. | 395/683 |
| 5,410,688 | 4/1995 | Williams et al. | 395/610 |
| 5,522,077 | 5/1996 | Cuthbert et al. | 395/683 |
| 5,551,035 | 8/1996 | Arnold et al. | 395/683 |
| 5,596,720 | 1/1997 | Hamada et al. | 395/200.03 |
| 5,666,479 | 9/1997 | Kashimoto et al. | 395/180 |
| 5,734,902 | 3/1998 | Atkins et al. | 395/683 |
| 5,758,078 | 5/1998 | Kurita et al. | 395/200.33 |

FOREIGN PATENT DOCUMENTS

| | | | |
|---|---|---|---|
| 0474340A2 | 8/1990 | European Pat. Off. | G06F 9/44 |
| 0497022A1 | 1/1991 | European Pat. Off. | G06F 15/40 |
| 91300772.0 | 1/1991 | WIPO | G06F 15/40 |
| 91306128.9 | 7/1991 | WIPO | G06F 9/44 |

OTHER PUBLICATIONS

Robert Orfali and Dan Harkey, "Client/Server With Distributed Objects", Apr., 1995, BYTE, pp. 151–162.

Maruyama, Katsumi, "Object–Oriented Switching Software Technology," IEICE Transactions on Communications, vol. E75–B, No. 10, Oct. 1992.

Gentry, Dennis, "Spreading the Wealth: DO and PDO", NeXTSTEP Developer Journal, p. (7), 1994.

Karve, Anita, "Operator, Give me Telephony", LAN Magazine, p. (7), Jul. 1994.

Orfali, Robert, Dan Harkey, "Client/Server Survival Guide with OS/2®", Van Nostrand Reinhold,, pp. 249–251, 402–409, 689–723, 757–771, 1994.

*Primary Examiner*—Alvin Oberley
*Assistant Examiner*—St. John Courtenay, III
*Attorney, Agent, or Firm*—Baker & Botts, L.L.P.

[57] ABSTRACT

A distributed object messaging system and method (10) are provided for a plurality of nodes (15–21, 25–32) distributed in multiple physically separate sites (12, 13). There are a plurality of processes (40–44) executing in each node. The processes register a plurality of objects in each node. The objects include client objects and server objects. The server objects may be registered for global service for service availability to client objects in a local node, local site and/or site global service for service availability for client object in remote sites. a server object database (46) is used in each node to store a server object description for each server object registered in the node and objects registered in remote nodes that are registered for global or site global service. a client-server interface (50) is accessible by client objects and receives requests for services therefrom. The client-server interface accesses the server object database (46) for at least one destination server object capable of performing the client object's requested service, and forwards the service request to the destination server objects at a local site or a remote site.

46 Claims, 7 Drawing Sheets

SYSTEM AND METHOD FOR MULTI-SITE DISTRIBUTED OBJECT MANAGEMENT ENVIRONMENT

TECHNICAL FIELD OF THE INVENTION

This invention is related in general to the field of distributed computer systems for telephony applications which may require redundancy of hardware and software services for reliability in multiple physical locations. More particularly, the invention is related to a system and method for multi-site distributed object management environment. This invention is especially applicable to telephony which may require redundancy of hardware and software services for reliabiity in multiple physical locations.

BACKGROUND OF THE INVENTION

The simplest most common interface between a client and server occurs when the client and server are linked into the same process. In this case, the client can invoke a subroutine call to access the server. Calling Input Parameters can be passed from the client to the server in common memory and Returned Output Parameters can be passed back from the server to the client through common memory to complete the call.

To utilize the power of distributed computing architecture, it is necessary that the server frequently reside in a network node which is remote from the client node. Multiple clients may be requesting the same service from multiple servers at the same time. In additiona, there is a requirement in telephony applications for both hardware and software redundancy to provide a hardware/software fault tolerant service environment. This environment consists of nodes in geographically remote locations in the global telecommunications network. The system must be able to quickly adjust to server outages at any point in the network.

SUMMARY OF THE INVENTION

Accordingly, there is a need for an environment which allows the replacement of the simple client/server subroutine call with access to the global network of servers in multiple sites.

In accordance with the present invention, a multi-site distributed object messaging system and method are provided which eliminates or substantially reduces the disadvantages associated with prior systems.

In one aspect of the invention, A distributed object messaging system and method are provided for a plurality of nodes distributed in multiple physically separate sites. There are a plurality of processes executing in each node. The processes register a plurality of objects in each node. The objects include client objects and server objects. The server objects may be registered for global service for service availability to client objects in a local node, local site and/or site global service for service availability for client object in remote sites. A server object database is used in each node to store a server object description for each server object registered in the node and objects registered in remote nodes that are registered for global or site global service. A client-server interface is accessible by client objects and receives requests for services therefrom. The client-server interface accesses the server object database for at least one destination server object capable of performing the client object's requested service, and forwards the service request to the destination server objects at a local site or a remote site.

In another aspect of the invention, a local cache is kept in each process to record past service requests and server object matches. The local cache is accessed first for service requests for a match if the server object database has not been altered since the last database access.

In yet another aspect of the invention, the current service state of a node is recorded in the server object database whenever one of its objects is registered. The contents of the server object database can then be adjusted in response to a node's upgrade or downgrade in service status.

BRIEF DESCRIPTION OF THE DRAWINGS

For a better understanding of the present invention, reference may be made to the accompanying drawings, in which.

DETAILED DESCRIPTION OF THE INVENTION

Figure 1:
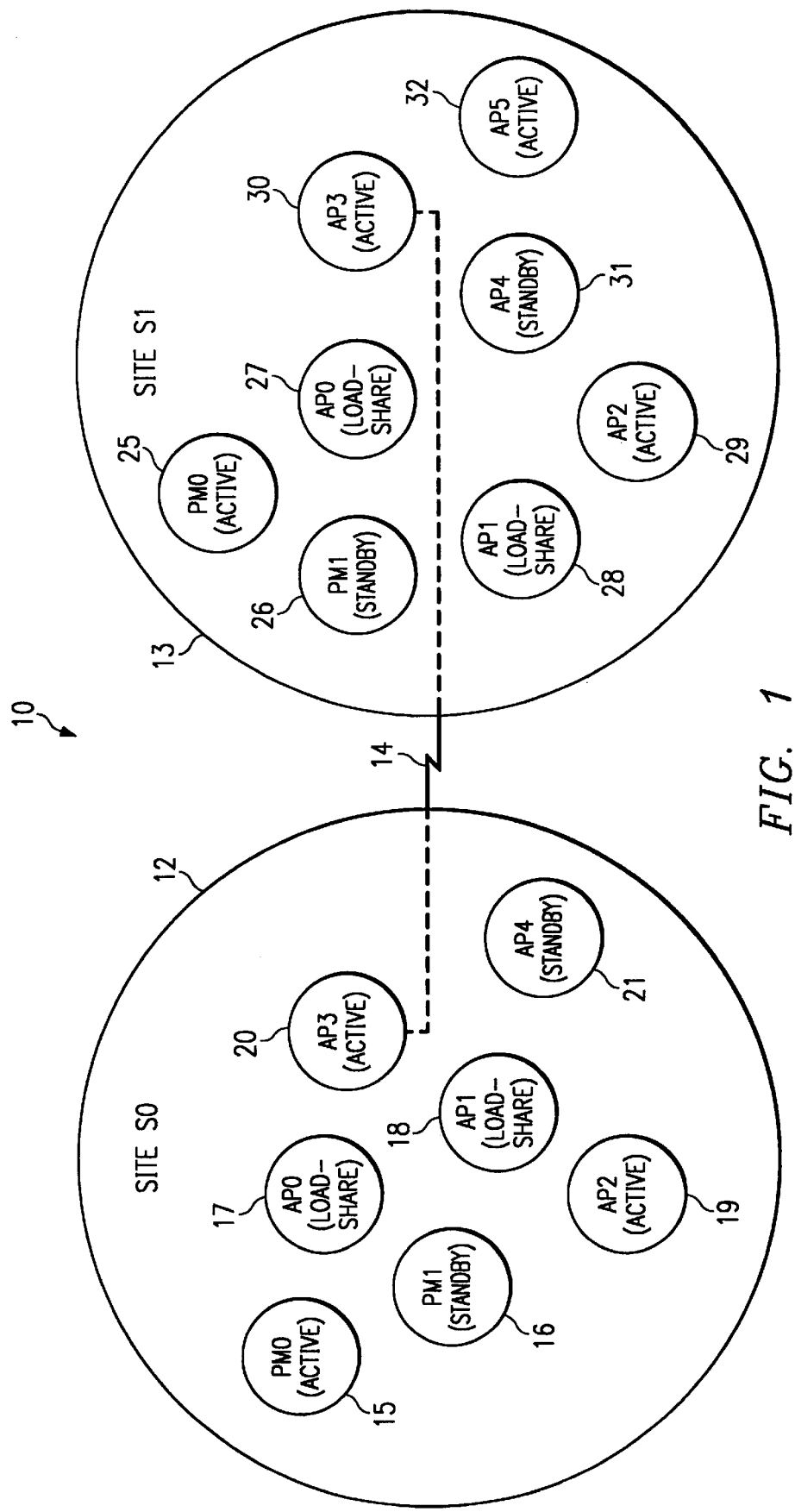
FIG. 1 is a top level diagram of nodes residing at two sites with a communication link therebetween.

The preferred embodiment(s) of the present invention is (are) illustrated in FIGS. 1–13, like reference numerals being used to refer to like and corresponding parts of the various drawings.

Referring to FIG. 1, a simplified diagram of a distributed object management environment (DOME) system in a multi-site environment generally indicated by reference numeral 10. DOME 10 is shown, for illustrative purposes, to include two sites Sites S0 and S1, referenced by 12 and 13 respectively, which are connected via some communications line such as a computer network or a Media Access Control (MAC) bridge 14. Each site 12 and 13 include a group of nodes 15–21 and 25–32, respectively. A DOME system may include one, two or multiple sites. The sites may be physically located remote from one another. For example, site 12 may be physically located in Chicago and node 13 may be physically located in New York.

A site may be defined as a group of nodes being connected by one or more computer network such as Ethernet.

Although not a requirement, the nodes in a site are typically located in close proximity to one another and operate cooperatively with one another. A node may be defined as a workstation with one or more central processing unit that executes an instance of an operating system and some application software or processes. Each site 12 and 13 may include an active platform manager (PM) node 15 and 25 which perform some specified primary management functions. A standby platform manager node 16 and 26 may be included to provide backup support in instances where active platform manager fails. Application nodes 17–21 and 27–32 may also be designated as "active/standby" and "load-share." The load-sharing designation causes a functionality or process to be equally assigned to and performed by the load-sharing nodes. As indicated in FIG. 1, each node may communicate directly with another node at another site as well as one at the same site.

Figure 2:
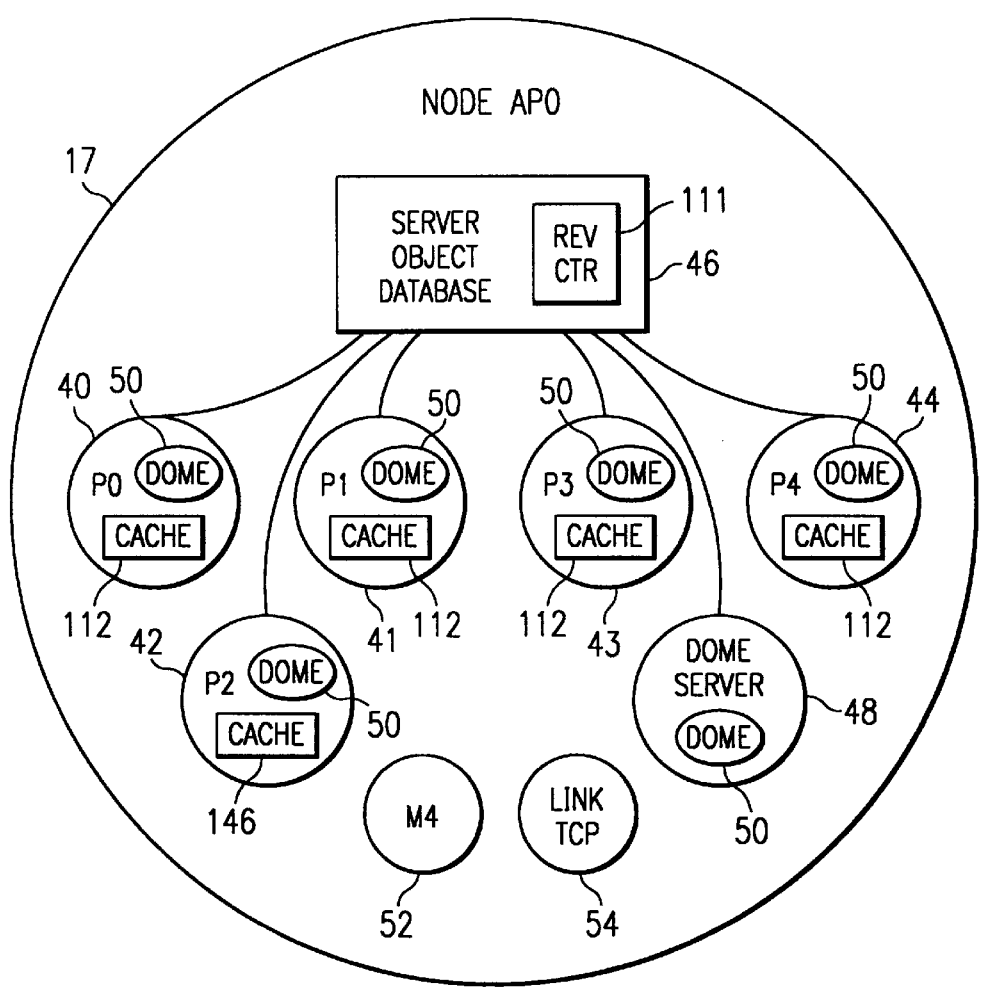
FIG. 2 is a simplified diagram of a node with a plurality of processes.

Referring to FIG. 2, node APO 17 is shown to include a number of processes P0–P4 40–44. Each process may be a client process, server process, or may function as a client to one process and a server to another. In addition, each node includes a DOME server process 48 which function as a registration interface between the client objects and server objects that reside in different processes within a node or in different nodes in the system, whether at the same site or not. Each process 40–44 may register one or more instances of objects with DOME server process 48, which stores information of registered objects in a server object database 46 that is accessible to the processes 40–44 in the node and other nodes at the same or different sites. Server object database 46 is read accessed by a client DOME interface every time the client requests service from a server object. All local server objects are accessed directly by the DOME client interface by placing the service request directly on the server object's message queue. A server object is defined as an encapsulation of functionality and data that are accessible to remote client objects by method invocations.

In each process 40–44, there is also an instance of DOME 50 which provides inter-process, inter-node, and inter-site communications between client and service objects. Point-to-point communication between nodes at the same site or different sites is possible on TCP/IP (Transmission Control Protocol/Internet Protocol) paths created by processes MH (Message Handler) 52 and LinkTCP (Link Transmission Control Protocol) 54 that reside in each node. The communications aspects of DOME is discussed in more detail below.

Figure 3:
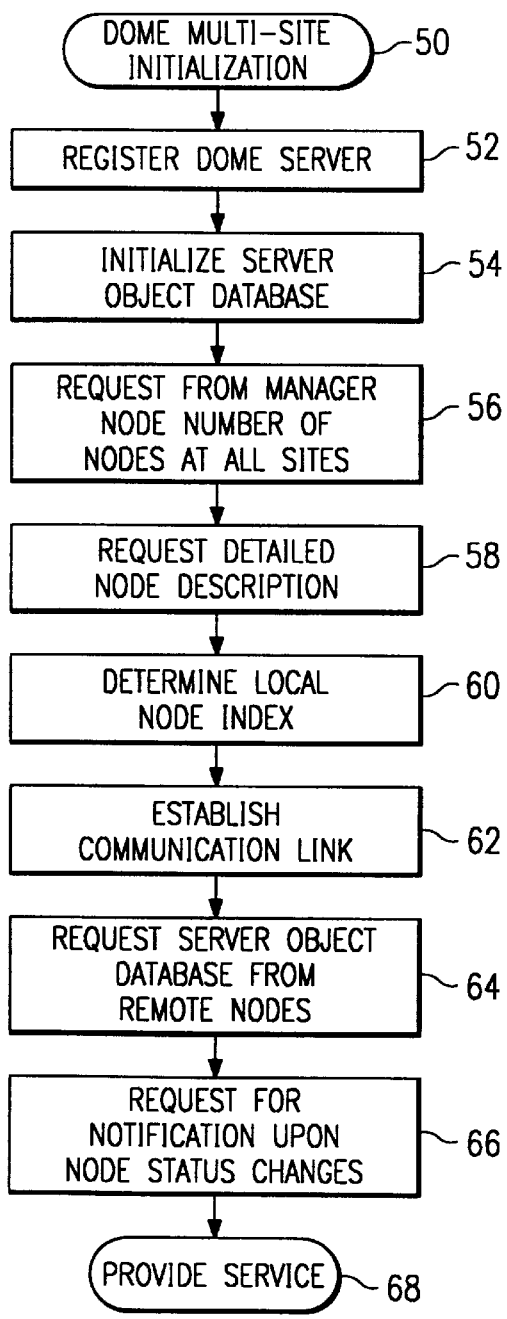
FIG. 3 is an exemplary flowchart of a DOME multi-site initialization process.

Referring also to FIG. 3, a simplified flowchart of an embodiment of multi-site DOME initialization process 50 is shown. When a system at a site starts up, one of the first steps is to invoke the DOME server process 48 and register its objects and server member functions, as shown in block 52. A server object has one or more server member functions which have a unique user defined interface for receiving from and sending call parameters to a client object. Server member functions are referenced by clients using identification numbers that are recorded in the server object descriptions. Each member function has a function prototype definition registered by the server object. A server member function description database (not shown) is maintained in each process to record the registered server member function descriptions of registered server objects in the process.

After object registration, the DOME server process 48 then initializes server object database 46, as shown in block 54. In blocks 56 and 58, DOME server process 48 then requests the platform manager node for the number of nodes at all the sites, and the detailed node descriptions for all the nodes. DOME server process 48 saves the node descriptions in object server database and searches the array of returned node descriptions to determine the array index of its own node and the name of the site it resides in, as shown in block 60. DOME server process 48 then establishes the communication links by communicating with MH and LinkTCP processes 52 and 54, as shown in block 62. In block 64, DOME server process 48 requests each remote node to send the contents of its object server database. The replies to these requests will permit DOME server process 48 to update object server database 46 with information about objects registered for global or site global service in other nodes. A global server object is visible to client objects in the same site while a site global server object is visible to client objects in other sites as well.

Figure 5:
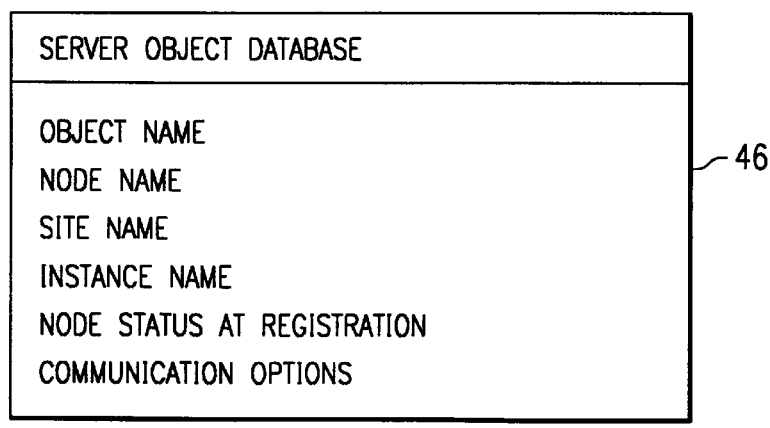
FIG. 5 is an exemplary server object database showing the type of information that is stored therein.

Referring also to FIG. 5, server object database 46 contains object descriptions such as the object name, node name, site name, and instance name. The object, node, site, and instance names may be alphanumeric strings or numerals following a predetermined naming convention. The node and/or site names may also be indices to respective lists kept in the server object database. Further, the names may be concatenated in a predetermined manner. Multiple copies of an object can be registered without the instance name provided that the node locations are different. The instance name allows a client object to select a unique instance of an object in a particular node. If the node name is not specified by a client object, then DOME assumes that any node containing the object is a suitable server.

Server object database 46 further includes the node operating status at object registration time. Node operating status includes out of service, operating system minimal (OS min), or in service. Also included is the operation modes of the object, which may include active/standby, load-shared, local service, global service, and site global service modes. Load-shared objects are active, and a selection method is used to evenly distribute the load between objects operating in this mode. Active/standby objects also register an access mode which specifies whether they are to receive requests in the active or standby states. The local, global, and site global service modes determine whether the object can service requests from client objects local to its resident node, site, or client objects from other sites, respectively. Server object database 46 further includes the communication options and specific information therefor of the object, such as whether TCP/IP or User Datagram Protocol/Transport Layer Interface (UDP/TLI) socket connection is used. If TCP/IP is used, the object's well-known port address is included.

In block 66, DOME server process 48 then requests that it be notified whenever any node changes its operating status, so that its server object database may be updated to reflect the changes. DOME server process 48 is then ready to provide service and waits for requests for service, as shown in block 68.

Figure 4:
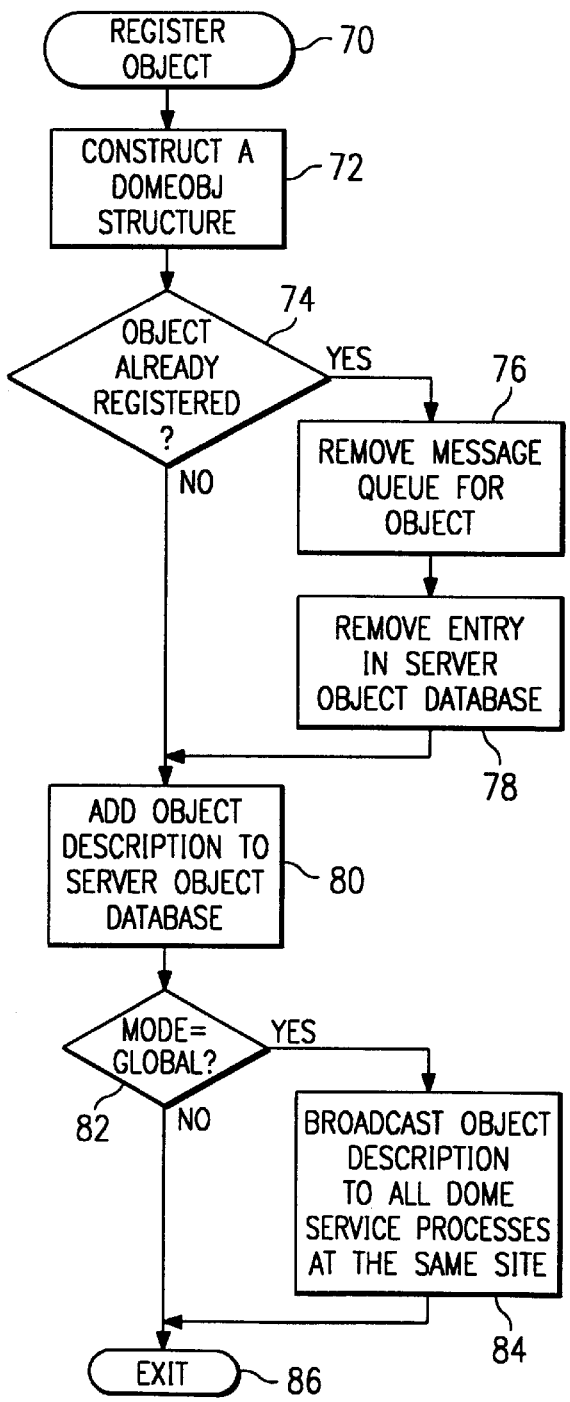
FIG. 4 is an exemplary flowchart of an object registration process.

FIG. 4 is a simplified exemplary flowchart of a process for registering an object 70. DOME first constructs a DOMEOBJ structure to provide temporary storage for the object's description, as shown in block 72. A determination is then made as to whether the object is already registered in block 74. If the object is already registered, its message queue is removed and its corresponding entry in server object database 46 is deleted, as shown in blocks 76 and 78. Subsequently in block 80, the object description of the object instance is added to server object database 46.

If the object is being registered with global service mode, as determined in block 82, then the object description is broadcast to all DOME server processes of all other nodes at the same site to make the newly registered object instance also visible to client objects in other nodes, as shown in block 84. The process then exits in block 86. Objects registered in site global service mode are not broadcast to remote sites at the time of registration. Site global objects are revealed to other sites when remote site nodes request for the server object database, which typically occurs on node status change.

Figure 6:
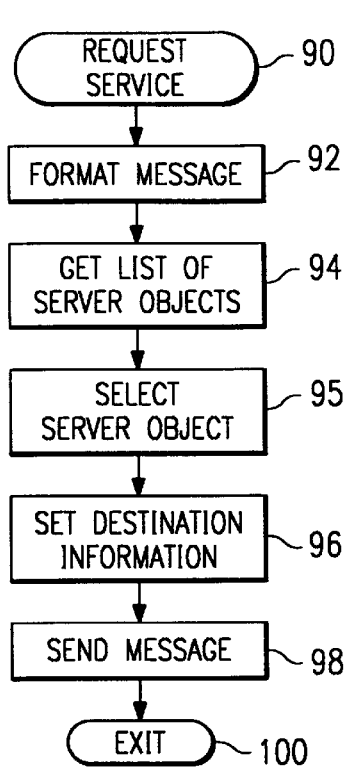
FIG. 6 is an exemplary flowchart of a request service process.

Referring to FIG. 6, a simplified flowchart for requesting service from a server object for a client object 90 is shown. The client object makes a service request and provides the calling parameters. DOME formats the client calling parameters for a server member function into a service request message, as shown in block 92. DOME then requests for a list of server objects matching the client's full or partial server object description, as shown in block 94. The server object database 46 (FIG. 2) is organized in such a way that a DOME process can readily access a particular object instance with a full description, or access all objects which match a partial description. For example, DOME may access all object instances in a node for a particular version of an object; or DOME may access all object instances in all nodes for all versions. The data entries for each field in the database are linked in alphabetical order using a hashing algorithm which allows fast access to an entry or group of entries. Further, the data is organized such that an object name entry points to a list of node entries, and each node entry points to a list of named instances. DOME selects a server object from the list as the destination for the service request, sends the request service message to the selected server object, and exits, as shown in blocks 95–100.

The following routing rules apply in a request service call:

1. If a unique local or remote node name is specified as the destination, the service request message is routed to that node without applying the active/standby and load-sharing routing rules discussed in detail below. This includes remote nodes that are not at the same site.
2. If the client object does not specify a destination, the request is routed to the local site server object(s) using the active/standby and load-sharing routing rules.
3. If a site name or remote site specifier is used as a destination, only site global registered server objects in that site is considered as destination targets and the active/standby and load-sharing routing rules apply.

Server objects and nodes may be registered as either active/standby or active (load-sharing) mode. Active objects are load-shared using a round robin selection algorithm to determine which object is to process the current service request. First the client DOME determines which node is at the highest service state. Then DOME selects the highest service state object instance within the highest service state node. The service state of a node may be out of service, OS min, or in service, depending on whether the platform manager and/or the application software is running. Details of service states are discussed below in conjunction with FIGS. 12 and 13. If multiple nodes are operating at the same service state, then the round robin algorithm or a similar algorithm may be used to equally distribute the service requests. Active objects may reside in a node which is registered as active/standby mode.

There are eight different server object routing algorithms which DOME may use when processing a client request for service. If a site name is specified in the destination field instead of a specific node name, then the node name is considered to be null and the node selection is limited to those nodes at the specified site. If a destination name is a null field, then the local site is specified.

The routing rules are:

| | Object Type | Node Name | Instance Name | Node Routing Method | Instance Routing Method |
|---|---|---|---|---|---|
| 1. | Act/Standby | null | null | 2 | 2 |
| 2. | Act/Standby | null | "Name" | 3 | 1 |
| 3. | Act/Standby | "Name" | null | 1 | 2 |
| 4. | Act/Standby | "Name" | "Name" | 1 | 1 |
| 5. | Active | null | null | 4 | 2 |
| 6. | Active | null | "Name" | 5 | 1 |
| 7. | Active | "Name" | null | 1 | 2 |
| 8. | Active | "Name" | "Name" | 1 | 1 |

The destination can be specified by specific name or using any of the following five specifiers:

REMOTE_SITE ("&"): Only route to nodes residing in remote sites using active/standby and load-shared routing rules for a request service call. For a broadcast call, send to all qualifying nodes.

ALL_SITES ("$"): Route to all nodes in all sites when used in a broadcast call. Use active/standby and load-shared routing rules for a request service call.

NOT_LOCAL_NOTE ("#"): Route to any node in the local site other than resident node for both a broadcast call or a request service call.

LOCAL_SITE ("?"): Route to any local site node in a broadcast call. Use active/standby and load-shared routing rules for a request service call.

LOCAL_NODE ("%"): Route to local node only for a broadcast or request service call.

The specifier characters enclosed in quotation marks may be used to specify the type of destination. Note that the characters set forth above serve as examples, and the present invention is not necessarily limited thereto.

When the client makes a service request, the object name is searched for in the server object database to determine if the object is an active/standby type or an always active type. Next, the node name is examined for either a null string or a unique ASCII name. The instance name is also examined for either a null string or a unique ASCII name. These three indicators are then used to access the node routing and instance selection methods.

Each of the eight server object routing algorithms consists of two parts. In the client node, DOME selects the best server node to service the request and sends the request to the node. This part of service routing is the server node selection method. In the server node, DOME selects the best server object instance to receive the request. This part of service routing is known as the server instance selection method. The above table contains an entry for each of the combinations of object type, node name, and instance name. Each entry specifies the node selection method and the instance selection method numbers which are described in detail below:

1. The client specifies a unique node name which must process the service request. First, the server object database is accessed to determine if the server object resides in the node name specified. If not found in the specified node, DOME declares an object not found error. If the server instance name is specified, then the server object database is searched to ensure that the instance named resides in the specified node name. An instance not found error is returned if the exact instance name does not exist in the node. The service request message is formatted and sent to the specified node.

2. The client specifies an object name that is an active/standby type and does not request a specific node or instance. The client DOME constructs an instance list of all instances in all nodes of the requested object name. The registered server object receive states is found in the server object database. The server object can be registered to receive in the active, standby, or active/standby state. The instance list is scanned for instances of the object which reside in nodes that are in the required receive state, either active, standby, or either. The service request is sent to one or more nodes which qualify. If no node qualifies, then an error return is made to the client.

3. The client specifies an object name that is active/standby and desires to send the service request to a specific instance name which can exist in any node in the system. The server object database is checked to determine which node the instance name resides in.

4. The object type is always active and the client has not specified a specific node or instance name. First, DOME constructs a list of all nodes which contain the object name. If none are found, an error is returned to the client. Next, DOME searches the list for the node in the highest service state, and deletes from the list any node which does not have the highest service state found. Then DOME selects a node from the remaining list of nodes based on a round robin selection algorithm. The previously selected index in the list is incremented and used to select the node to use in this service request.

5. The object type is always active and the client has specified a specific instance name. First, DOME constructs a list of all nodes which contain the object name and specific instance name. If none are found, an error is returned to the client. Next, DOME searches the list for the node in the highest service state and deletes from the list any node which does not have the highest service state found. Finally, DOME selects a node from the remaining list of nodes based on a round robin selection algorithm. The previously selected index in the list is incremented and used to select the node to use in this service request.

Alternatively, a client object may make a specialized request to a server in another node that is not listed in the local server object database. These are servers that have not been registered as site global server objects. This specialized request is forwarded to the Message Handler process, which looks up the destination queue ID for the requested object and forwards the message to that object's DOME server process. The DOME server interface of the server object then receives the service request message and format the parameters contained in the message into the input sequence expected by the server object. The server object then receives the message and performs the requested service.

Figure 7:
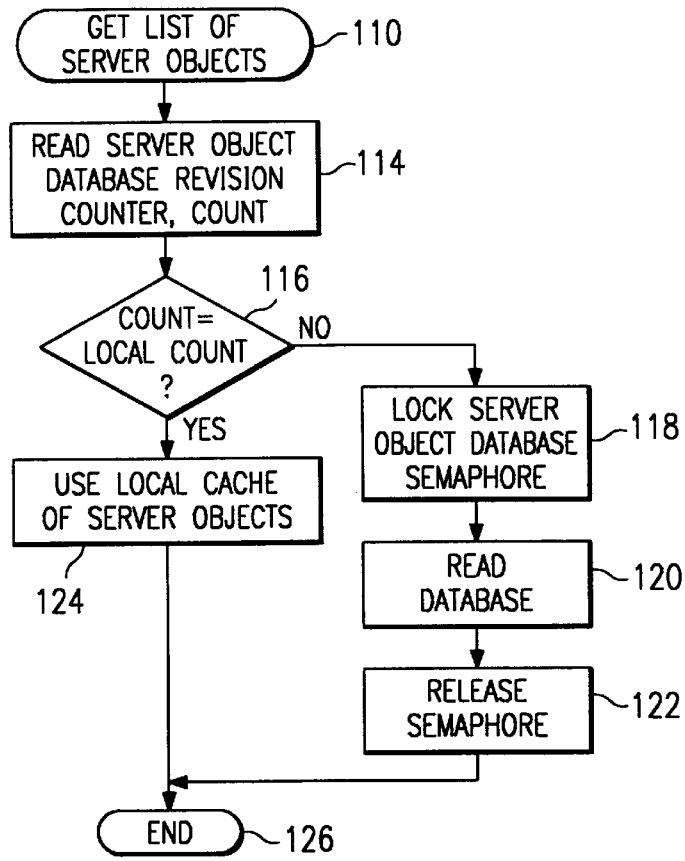
FIG. 7 is an exemplary flowchart of a get list of server objects process.

FIG. 7 provides some additional details of the process for getting the list of server objects 110. Referring also to FIG. 2, server object database 46 includes a revision counter 111, which is incremented every time the contents of the database is modified. Each process 40–44 in the node has a local cache 112, the contents of which is a historical record of past service requests and corresponding matched server object to perform the service requested. Local cache 112 also keeps a record of what the revision counter count was at the time of last database access. In blocks 114 and 116, revision counter 111 is read and compared with the local record of the count. If the numbers do not match, then the contents of server object database 46 have been altered and the contents of local cache 112 are no longer valid. Therefore, server object database 46 is accessed by first locking the semaphore, reading the relevant entry or entries in database 46, and then releasing the semaphore, as shown in blocks 118–122. On the other hand, if the count kept locally and the revision counter are the same, the local cache of object descriptions can be searched for a match, a shown in block 124. Also, if there is no match with the service request, server object database 46 is accessed in a similar manner as shown in blocks 118–122. Subsequently, the process ends in block 126.

Figure 8:
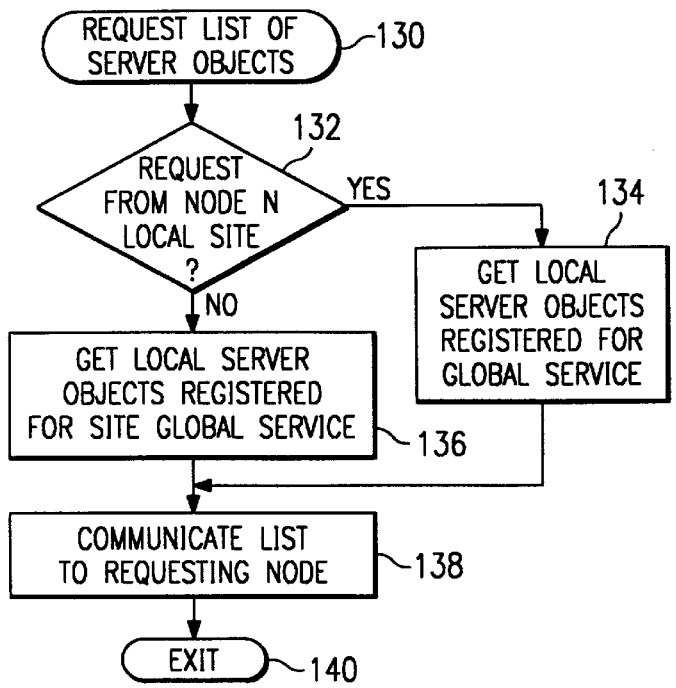
FIG. 8 is an exemplary flowchart of a request list of server objects process.

When a node is first initialized, it requests other nodes at the same site to supply it with the object descriptions stored in their server object databases, as shown in block 64 of FIG. 3. Site global servers are not broadcast to remote sites as they are registered; site global server objects become visible to remote site clients when the remote site nodes ask for the server object database, which typically occurs on node status change. The request for list of server objects process 130 is shown in FIG. 8. A determination is made as to whether the request is from a node at a local site or a remote site in block 132. If the request is from a local site, the object descriptions of server objects registered for global service is obtained, as in block 134. Else, the object description desired is of server objects registered for site global service, which is obtained in block 136. The object description is then communicated to the requesting node, as shown in block 138. The process ends in block 140.

Figure 9:
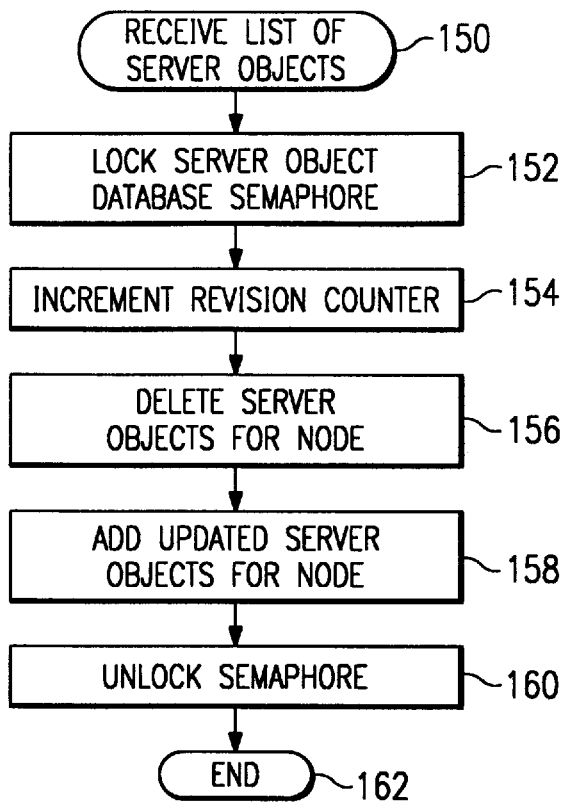
FIG. 9 is an exemplary flowchart of a receive list of server objects process.

FIG. 9 shows the process flow for receiving the object description from either a node at the local site or a remote site 150. Upon receipt of the object description, the semaphore of server object database is obtained to lock out other processes, as shown in block 152. In block 154, the revision counter kept for the database is then incremented to reflect that the database is modified. The server object description for the node in question is then deleted and the updated description is inserted into the server object database, as shown in blocks 156 and 158. The semaphore is then released in block 160 and the process ends in block 162.

Figure 10:
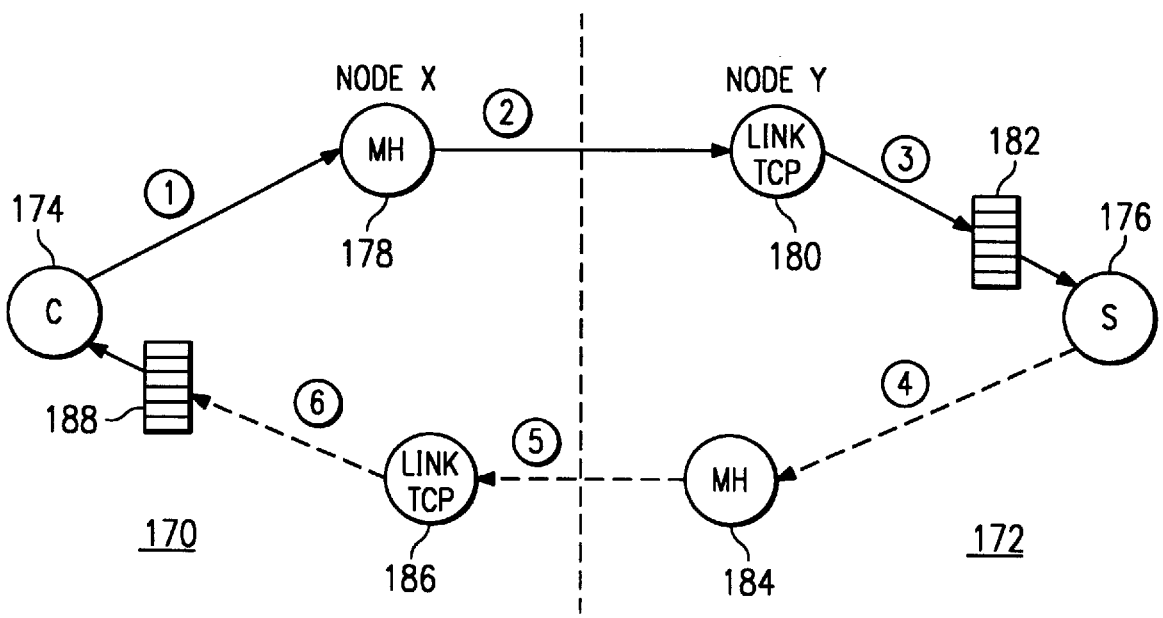
FIG. 10 is a diagram of an inter-node communications process.

As set forth above, inter-node communication is done through the Message Handler and LinkTCP processes. FIG. 10 illustrates the communications process. FIG. 10 shows a client object 174 and a server object 176, where client and server objects reside in different nodes X and Y, 170 and 172 respectively. When server object 172 resides in a different node, DOME uses a network logical link interface provided by the two specialized processes, the Message Handler and LinkTCP for inter-node communication. Message Handler and LinkTCP processes create TCP/IP paths for inter-node communications. To send the service request, DOME forwards the client request to a resident Message Handler process 178. Message Handler then forwards the request to the destination node LinkTCP process 180, which places the service request in the server object IPC system V message queue 182 to be received by server object 176. Server object may be informed of the service request by a predetermined signal announcing the arrival of the message. Alternatively, server object may poll for the existence of service requests or suspend until a service request is present. Each message queue 182 may have a predefined maximum capacity limit on the number of messages and the total number of bytes.

If there is a result or reply to be returned to client object 174, it is first sent to a Message Handler 184 resident in node X 172. Message Handler 184 then transmits the return message to a LinkTCP process 186 resident in node Y 170. The message is then placed in a message queue 188 of client object 174. Each client request is marked with a unique transaction ID which is returned to the client with the server reply. The client object may then be assured that the correct reply from the server object is returned for the request that was made. Note that when the destination server object resides in the same node as the client object, the service request message is transmitted directly from client object to the message queue of the server object.

Figure 11:
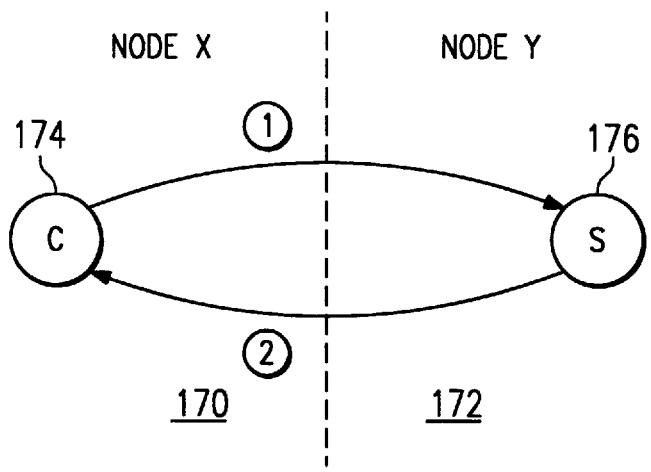
FIG. 11 is a diagram of another inter-node communications process.

FIG. 11 shows another method of inter-node communications. A client object 174 residing in node X 170 may send a service request via UDP to a server object 176 residing in node Y 172. Results of the service performed, if any, may be transmitted back to client object 174 in the same manner. This method involves less overhead than the TCP/IP transmission method but does not guarantee message delivery. A global server object may broadcast its well-known UDP port ID to other nodes where it is registered. A site global server object's well-known UDP port ID is made available to nodes in other sites when the server object database of its resident node is requested by the remote nodes.

Figure 12:
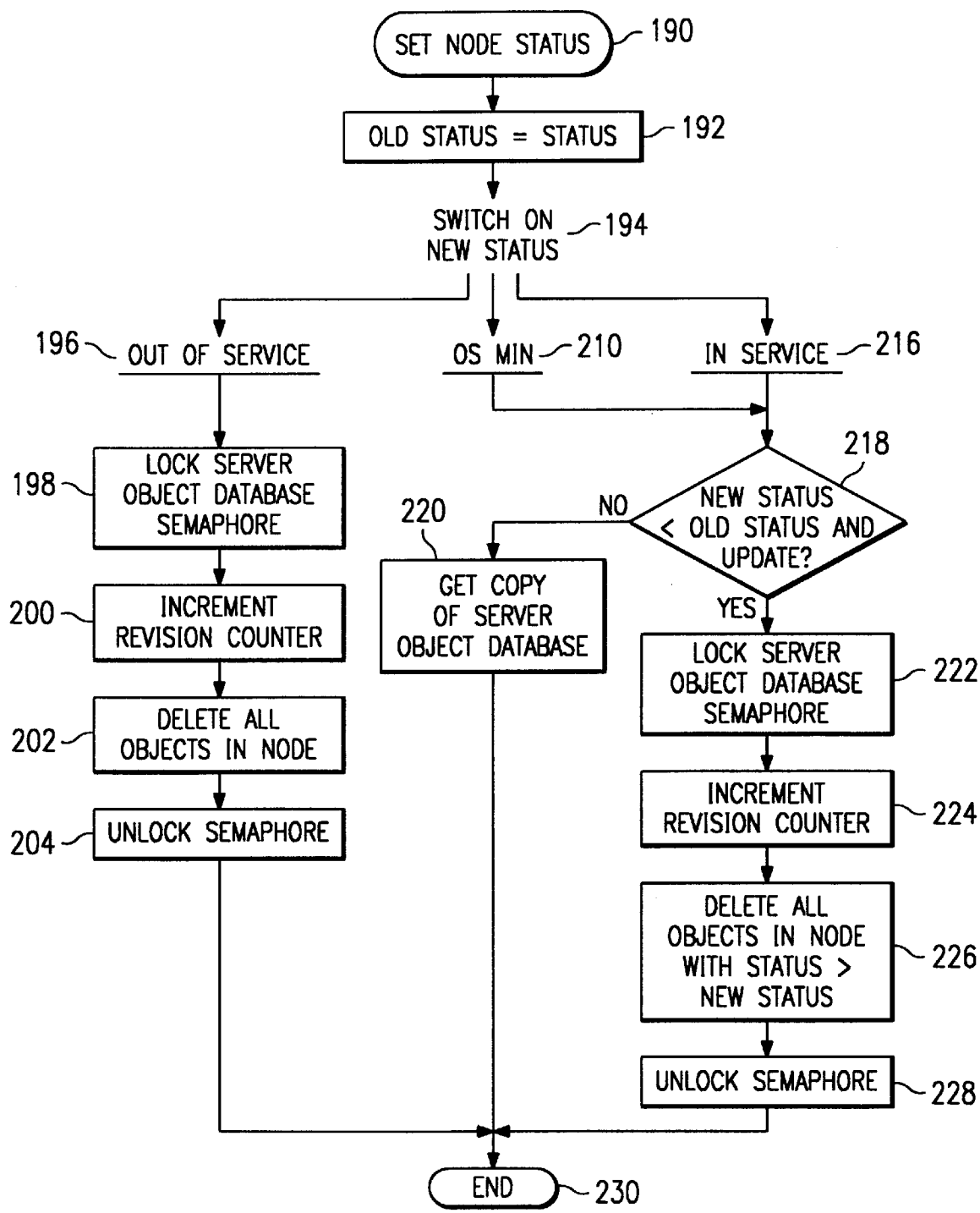
FIG. 12 is an exemplary flowchart of a set node status process.

Referring to FIG. 12, a set node status process 190 is used to automatically update a server object database to reflect a node status change. Every time the status or service state of a remote node is changed, the DOME server 48 (FIG. 2) process of a node updates its server object database. The node receives the new status of the remote node that experienced a change in status, and sets the old status to equal to the prior service state, as shown in block 192. If the new status is out of service, as shown in blocks 194 and 196, indicating that the node is no longer up and running, then the contents of the server object database must be updated to remove the registered objects of the downgraded node. This is done by first locking the semaphore of the server object database and incrementing the revision counter, as shown in blocks 198 and 200. The registered server objects resident in the downgraded node are then deleted from the server object database, as shown in block 202. The semaphore is then released in block 204. The server object database is therefore purged of all registered objects that were resident in the out of service node.

If the new status is OS min, as determined in blocks 194 and 210, or the new status is in service, as determined in block 216, the server object database may need to be updated depending on whether the node status is upgraded or downgraded, as determined in block 218. An upgrade in status, corresponding to a transition in the direction of:

out of service→OS min→in service would make the condition in block 218: new status<old status be false. On the other hand, a transition in the direction of:

in service→OS min→out of service would make the condition in block 218 be true. The boolean variable UPDATE may be used to positively request that the database be purged of server objects that are no longer available for service. If the condition in block 218 is false, then a copy of the entire server object database of the remote node is requested and added to the local database, as shown in block 220. The server object request and receive processes are shown in FIGS. 8 and 9 described above.

If the condition in block 218 is true, then the contents of the server object database of the local node need to be selectively deleted. If there is a downgrade in service state, then the objects that were registered at a service state higher than the current new status are no longer valid and their respective description is removed from the server object database. The semaphore of the server object database is first secured, as shown in block 222. The revision counter is then incremented to reflect this recent change in the contents of the database. Subsequently in block 226, all objects having status at registration time greater than the new status are deleted from the database since they are no longer running. The semaphore is then released in block 228, and the procedure ends in block 230. Because the service state of the node is noted in the server object database when an object registers, the database may be automatically updated to remove those objects that are no longer valid when the status of the respective node is downgraded.

Figure 13:
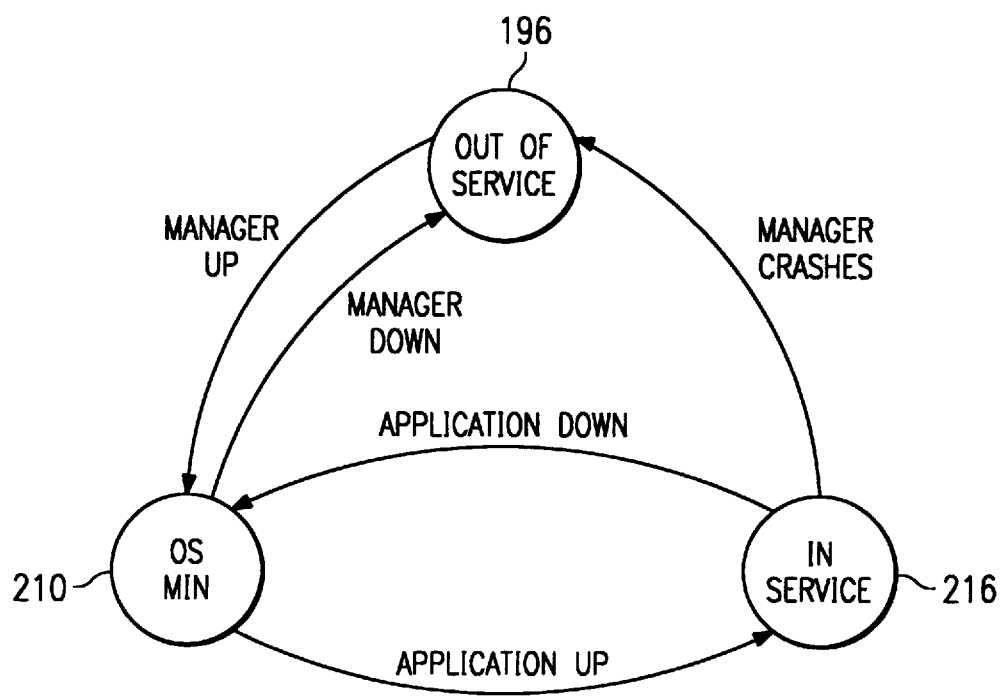
FIG. 13 is an exemplary state diagram of node service states.

FIG. 13 is a state diagram showing the service state transitions of a node. The transition between the out of service state 196 and the OS min state 210 is caused by whether platform manager 40 and 41 (FIG. 2) is up and running. If the platform manager is down, the node is at the out of service state 196; if the platform manager is up and no application software is running, the node is at the OS min state 210. If, on the other hand, the platform manager is up and the application software is running, then the node is at the in service state 216. According to the state diagram, it may be observed that all platform manager objects have the out of service status at registration time, and all other process objects have the OS min status at registration time.

Preferably, all DOME interfaces are in a run-time shared library and linked with the user code at run-time on demand. Since shared libraries can be accessed by more than one process, the user may instantiate a DOME object in the user's own process space. As DOME member functions are referenced, they are linked in at execution time from the shared library.

Although the present invention and its advantages have been described in detail, it should be understood that various changes, substitutions and alterations can be made therein without departing from the spirit and scope of the invention as defined by the appended claims.

What is claimed is:

1. A distributed object messaging system for a plurality of sites located geographically remote from each other and coupled to one another via at least one telecommunication link, each site having a plurality of processor nodes coupled by at least one telecommunications network, the system comprising:

a plurality of processes executing in each processor node, wherein each of the plurality of processes perform telephony applications;

said plurality of processes registering a plurality of objects, said objects including client objects and server objects, and each object having at least one instance thereof, wherein each object is a representation of a portion of hardware and software services provided by the telephony applications;

said plurality of server objects being selectively registered for global service for service availability to client objects in a local node and a local site, and site global service for service availability to client objects in a processor node at geographically remote sites, each processing node registering server objects from other nodes at its local site, and nodes from geographically remote sites, which have been registered for global, or site global, service, wherein server objects registered for global service are broadcast to other processor nodes at the local site upon registration and server objects registered for site global service are sent to a particular processor node at a remote site over the telecommunications network upon a request therefrom and not broadcast upon registration;

a server object database residing in each processor node storing a server object description for each registered server object, said server object description including an object name, a node name, a site name, and an instance name if more than one instance of an object is registered in the same processor node; and a client-server interface being accessible by said client objects and receiving requests for services therefrom, accessing said server object database for at least one destination server objects capable of performing said requested service, formatting said service request into a message, and forwarding said message to said destination server objects at a local node, load site, or a processor node at a geographically remote site.

2. The system, as set forth in claim 1, wherein said plurality of processes further comprises a local cache of past server object database access requests and destination server objects.

3. The system, as set forth in claim 2, wherein said server object database further comprises a revision counter recording a count of revisions performed on said server object database, said client-server interface accessing said local cache for matching server objects in response to a local revision count being equal to said count of said revision counter in said server object database, and accessing said server object database in response to said local revision count being unequal to said count of said revision counter in said server object database.

4. The system, as set forth in claim 1, further comprising:

a message handler process residing in each processor node for sending messages to destination server objects residing in processor nodes at geographically remote sites; and a LinkTCP process residing in each processor node for receiving messages from client objects objects residing in processor nodes at geographically remote sites.

5. The system, as set forth in claim 4, wherein said message handler and LinkTCP processes create point-to-point TCP/IP paths between local nodes and processor nodes at geographically remote sites for sending and receiving said messages.

6. The system, as set forth in claim 1, wherein said server object description stored in said server object database further includes a processor node service state at object registration time.

7. The system, as set forth in claim 6, wherein said processor node service state includes an out of service state, a minimal service state, and an in service state.

8. The system, as set forth in claim 6, wherein said server object database is purged of registered objects having a higher service state than a current service state of a resident node of said registered objects in response to a downgrade of service state of said resident node.

9. The system, as set forth in claim 6, wherein said server object database is replaced by a new copy of a server object database of a processor node at a geographically remote site in response to an upgrade of service state of said processor node at said geographically remote site.

10. The system, as set forth in claim 1, wherein said server object description stored in said server object database further includes an operation mode of said registered objects, said operation modes including active/standby and load-sharing modes.

11. The system, as set forth in claim 1, wherein said server object description stored in said server object database further includes a message queue ID for each registered object.

12. The system, as set forth in claim 1, wherein said server object description stored in said server object database further includes a well known port ID for each registered object.

13. A method for distributed object messaging for a plurality of geographically remote sites, each site having a plurality of interconnected nodes, and each node having a plurality of processes executing therein, the method comprising the steps of:

registering at least one instance of a plurality of server objects by a plurality of processes in each node, said server objects being registered for local, global, and/or site global service, wherein each of the plurality of processes perform telephony applications, each server object providing a representation of a portion of hardware and/or software services provided by the telephony applications;

storing a server object description of each registered object in a server object database, said server object description includes an object name, a node name, a site name, and an instance name if more than one instance of an object is registered in the same node;

broadcasting said server object descriptions of server objects registered for global service to other nodes at a local site upon registration;

providing said server object descriptions of server objects registered for site global service to nodes at geographically remote sites over a telecommunications network upon request therefrom at node initialization or status change;

requesting server object descriptions of server objects registered for site global service from nodes at geographically remote sites upon node initialization or status change;

receiving and registering said server object descriptions of global service registered server objects from other nodes at the local site;

receiving and registering said server object descriptions of site global service registered server objects from nodes at geographically remote sites over the telecommunications network;

storing said received server object descriptions in said server object database;

receiving service requests from client objects, searching said server object database for a destination server object capable of performing said service requests, formatting said service requests into messages, and forwarding said messages to said destination server object at the local node, local site, or a geographically remote site.

14. The method, as set forth in claim 13, further comprising the steps of:

storing a revision count in said server object database in response to the number of revisions made to said server object database;

storing a local historical cache of past service requests and destination server objects capable of performing the service request in each process;

storing a local revision count in said local historical cache;

accessing said local historical cache in response to a service request and said local revision count being equal to said revision count in said server object database; and accessing said server object database in response to a service request and said local revision count not being equal to said revision count in said server object database.

15. The method, as set forth in claim 14, wherein said server object description storing step further comprises the step of storing a node service state at object registration time for each registered object.

16. The method, as set forth in claim 15, wherein said step of storing a node service state further includes the step of storing an out of service state, a minimal service state, or an in service state.

17. The method, as set forth in claim 15, further comprising the step of:

downgrading a node to a lower service state; and purging from said server object database registered objects resident in said downgraded node having a higher service state than said lower service state of said downgraded node.

18. The method, as set forth in claim 15, further comprising the step of:

upgrading a node to a higher service state;

notifying all other nodes at the local site and at geographically remote sites of said upgraded node's higher service state;

requesting for a copy of contents of server object database of said upgraded node; and storing said copy in server object database in all other nodes.

19. The method, as set forth in claim 13, wherein the step of storing server object description further comprises the step of storing an operation mode of said registered objects, said operation modes including active/standby and load-sharing modes.

20. The method, as set forth in claim 13, wherein the step of storing server object description further comprises the step of storing a message queue ID for each registered object.

21. The method, as set forth in claim 13, wherein the step of storing server object description further comprises the step of storing a well known port ID for each registered object.

22. The method, as set forth in claim 13, wherein the step of storing server object description further comprises the step of storing an operation mode specifying an active/standby mode or load-sharing mode.

23. The method, as set forth in claim 22, wherein said step of searching said server object database for destination server objects comprises the step of distributing service requests substantially equally among said destination server objects in response to said server objects being registered for load-sharing operating mode.

24. The method, as set forth in claim 22, wherein said step of searching said server object database for destination server objects comprises the step of distributing service requests substantially equally among said destination server objects using a round robin algorithm in response to said server objects being registered for load-sharing operating mode.

25. The method, as set forth in claim 13, wherein the step of forwarding said messages to said destination server objects comprises the step of establishing a communications link to a destination node in which said destination server object resides.

26. The method, as set forth in claim 13, wherein the step of forwarding said messages to said destination server objects comprises the step of establishing a TCP/IP communications link to a destination node in which said destination server object resides.

27. The method, as set forth in claim 13, wherein the step of forwarding said messages to said destination server objects comprises the step of forwarding said message via a UDP/TLI socket connection of a destination node in which said destination server object resides.

28. The method, as set forth in claim 25, wherein the step of forwarding said messages to said destination server objects comprises the steps of:

forwarding said formatted message to a message handler process, said message handler process sending said message to a LinkTCP process in said destination node; and forwarding said message to said destination server object.

29. The method, as set forth in claim 13, further comprising the step of receiving a reply from said destination server object.

30. In a telephony application running in multiple physically distinct sites, a method for distributed object messaging among said multiple sites, each site having a plurality of interconnected nodes, and each node having a plurality of processes executing therein, the method comprising the steps of:

registering at least one instance of a plurality of server objects by a plurality of processes in each node, said server objects being registered for service for a local node, global service for a local site, and/or site global service for geographically remote sites, wherein each of the plurality of processes perform telephony applications, each service object providing a representation of a portion of hardware and/or software services provided by the telephony applications;

storing a server object description of each registered object in a server object database, said server object description includes an object name, a node name, a site name, and an instance name if more than one instance of an object is registered in the same node;

broadcasting said server object descriptions of server objects registered for global service to other nodes at the local site upon registration;

providing said server object descriptions of server objects registered for site global service to nodes at geographically remote sites over a telecommunications network upon request therefrom at node initialization or status change, said broadcasted and provided server object descriptions being stored in server object databases at other nodes at the local site and nodes of geographically remote sites respectively;

requesting server object descriptions of server objects registered for site global service from nodes at geographically remote sites over the telecommunications network upon node initialization or status change;

receiving and registering said server object descriptions of registered server objects from other nodes at the local site and from nodes of geographically remote sites over the telecommunications network;

storing said received server object descriptions in said server object database;

receiving service requests from client objects, searching said server object database for destination server object capable of performing said service requests, formatting said service requests into messages, and forwarding said messages to said destination server objects at the local site or a geographically remote site.

31. The method, as set forth in claim 30, further comprising the steps of:
   storing a revision count in said server object database in response to the number of revisions made to said server object database;
   storing a local historical cache of past service requests and destination server objects capable of performing the service request in each process;
   storing a local revision count in said local historical cache;
   accessing said local historical cache in response to a service request and said local revision count being equal to said revision count in said server object database; and
   accessing said server object database in response to a service request and said local revision count not being equal to said revision count in said server object database.

32. The method, as set forth in claim 31, wherein said server object description storing step further comprises the step of storing a node service state at object registration time for each registered object.

33. The method, as set forth in claim 32, wherein said step of storing a node service state further includes the step of storing an out of service state, a minimal service state, or an in service state.

34. The method, as set forth in claim 32, further comprising the step of:
   downgrading a node to a lower service state; and
   purging from said server object database registered objects resident in said downgraded node having a higher service state than said lower service state of said downgraded node.

35. The method, as set forth in claim 32, further comprising the step of:
   upgrading a node to a higher service state;
   notifying all other nodes at the local site and at geographically remote sites of said upgraded node's higher service state;
   requesting for a copy of contents of server object database of said upgraded node; and
   storing said copy in server object database in all other nodes.

36. The method, as set forth in claim 30, wherein the step of storing server object description further comprises the step of storing an operation mode of said registered objects, said operation modes including active/standby and load-sharing modes.

37. The method, as set forth in claim 30, wherein the step of storing server object description further comprises the step of storing a message queue ID for each registered object.

38. The method, as set forth in claim 30, wherein the step of storing server object description further comprises the step of storing a well known port ID for each registered object.

39. The method, as set forth in claim 30, wherein the step of storing server object description further comprises the step of storing an operation mode specifying an active/standby mode or load-sharing mode.

40. The method, as set forth in claim 39, wherein said step of searching said server object database for destination server objects comprises the step of distributing service requests substantially equally among said destination server objects in response to said server objects being registered for load-sharing operating mode.

41. The method, as set forth in claim 39, wherein said step of searching said server object database for destination server objects comprises the step of distributing service requests substantially equally among said destination server objects using a round robin algorithm in response to said server objects being registered for load-sharing operating mode.

42. The method, as set forth in claim 30, wherein the step of forwarding said messages to said destination server objects comprises the step of establishing a communications link to a destination node in which said destination server object resides.

43. The method, as set forth in claim 30, wherein the step of forwarding said messages to said destination server objects comprises the step of establishing a TCP/IP communications link to a destination node in which said destination server object resides.

44. The method, as set forth in claim 30, wherein the step of forwarding said messages to said destination server objects comprises the step of forwarding said message via a UDP/TLI socket connection of a destination node in which said destination server object resides.

45. The method, as set forth in claim 42, wherein the step of forwarding said messages to said destination server objects comprises the steps of:
   forwarding said formatted message to a message handler process, said message handler process sending said message to a LinkTCP process in said destination node; and
   forwarding said message to said destination server object.

46. The method, as set forth in claim 30, further comprising the step of receiving a reply from said destination server object.

* * * * *